US011162800B1

(12) United States Patent
Carbery et al.

(10) Patent No.: US 11,162,800 B1
(45) Date of Patent: Nov. 2, 2021

(54) ACCIDENT FAULT DETECTION BASED ON MULTIPLE SENSOR DEVICES

(71) Applicant: Arity International Limited, Belfast (GB)

(72) Inventors: Andrew L. Carbery, Bartlett, IL (US); Matthew James Manzella, Glen Ellyn, IL (US); Cynthia Sandberg, West Dundee, IL (US); Connor Walsh, Lake Forest, IL (US)

(73) Assignee: Arity International Limited, Belfast (GB)

( * ) Notice: Subject to any disclaimer, the term of this patent is extended or adjusted under 35 U.S.C. 154(b) by 230 days.

(21) Appl. No.: 14/992,704

(22) Filed: Jan. 11, 2016

(51) Int. Cl.
*G01C 21/34* (2006.01)
*G01C 21/28* (2006.01)

(52) U.S. Cl.
CPC ......... *G01C 21/3407* (2013.01); *G01C 21/28* (2013.01); *G01C 21/3492* (2013.01)

(58) Field of Classification Search
CPC . G01C 21/3407; G01C 21/28; G01C 21/3492
See application file for complete search history.

(56) References Cited

U.S. PATENT DOCUMENTS 8,799,034 B1 * 8/2014 Brandmaier ........... G07C 5/008
705/4

2010/0030586 A1 * 2/2010 Taylor .................... G06Q 30/02
705/4
2011/0058048 A1 * 3/2011 Elazar ................ H04N 1/32101
348/207.1
2015/0120094 A1 4/2015 Kimchi et al.

OTHER PUBLICATIONS

Thompson et al., "Using smartphones to detect car accidents and provide situational awareness to emergency responders", https://www.dre.vanderbilt.edu/~schmidt/PDF/wrechwatch.pdf.*
White et al., "Using smartphones to detect car accidents and provide situational awareness to emergency responders", https://www.dre.vanderbilt.edu/~schmidt/PDF/wrechwatchj.pdf.*
Index of Schmidt which contains the date the files of Thompson and White were created.*
http://www.nydailynews.com/news/money/toyota-secretive-black-box-data-explain-crashes-blamed-sudden-acceleration-article-1.174574, Mar. 5, 2010, Associated Press.*
https://en.wikipedia.org/wiki/Comparison_of_smartphones, "Comparision of smartphones", author(s) unknown.*

(Continued)

*Primary Examiner* — Vincent Wall
(74) *Attorney, Agent, or Firm* — Polsinelli PC

(57) ABSTRACT

Systems and methods are disclosed for detecting vehicular accidents based on sensor data, such as data from a mobile device in a vehicle or data from the vehicle's sensors. If an accident is detected, the system may determine whether to collect sensor data from additional sources, such as additional vehicle sensors or additional mobile devices (e.g., a pedestrian's mobile device or a mobile device within a vehicle). The system may also determine whether to collect data from traffic devices or from contextual data sources. The data may be used by the system to determine which party is at fault in the accident. The data may also be used to generate a visualization of the accident.

20 Claims, 3 Drawing Sheets

(56) References Cited

OTHER PUBLICATIONS

*Cleveland Clinic Foundation* v. *True Health Diagnostics LLC*, (Fed. Cir. Jun. 16, 2017) (Lourie, Reyna, Wallach) (Year: 2017).*
htttps://web.archive.org/web/20100721235710/http://www.aras360.com/, Jul. 21, 210 (Year: 2010).*
Jorge Mendoza, "Accident reconstruction and visibility studies are enhanced with camera-matched 3D video.pdf", plantiff magazine, Mar. 2008, pp. 1-5 (Year: 2008).*
Tim Stenovec, "http://www.businessinsider.com/how-google-maps-knows-about-traffic-2015-11", Buisness Insider, Dec. 18, 2015 (Year: 2015).*
Dixon-Warren, St.J., "Motion Sensing in the IPhone 4: MEMS Acceleromter", https://www.memsjournal.com/2010/12/motion-sensing-in-the-iphone-4-mems-accelerometer.html#:~:text=The%20original%20iPhone%2C%20which%20was,both%20corresponding%20to%203DoF%20sensing, Dec. 23, 2010, (Year: 2010).*
"Data Analytics and Processing", Cambridge Mobile Telematics, 2016, retrieved Jan. 6, 2016 from <http://www.cmtelematics.com/product/data-analytics/>.
"Amazon's Droid Will Track You Down Using Your Smartphone", David Nield, Digital Trends, May 9, 2015, retrieved from <http://www.digitaltrends.com/cool-tech/amazons-drones-will-track-you-down-using-your-smartphone/>.
"Danlaw, Inc.", Danlaw, Inc., 2016, retrieved from <http://www.danlawinc.com/>.
"Do We Really Want Amazon's Drones to Swarm Our Skies?", Jordan Golson, Wired Magazine, Aug. 4, 2015, retrieved from <http://www.wired.com/2015/08/really-want-amazons-drones-swarm-skies/>.
"Drive Smarter. DriveWell.", Cambridge Mobile Telematics, 2016, retrieved from <http://www.cmtelematics.com/product/drivewell/>.
"DriveWell Plus", Cambridge Mobile Telematics, 2016, retrieved Jan. 6, 2016 from <http://www.cmtelematics.com/product/drivewell-plus/>.
"Mojio", retrieved Jan. 6, 2016.
"Hi, we're Metromile", Metromile Inc., 2015, retrieved Jan. 6, 2016 from <https://www.metromile.com/>.
"Texting and Distracted Driving Solutions", Cell Control, retrieved Jan. 6, 2016 from <http://www.cellcontrol.com/texting-and-distracted-driving-solutions-driver-safety>.

* cited by examiner

ACCIDENT FAULT DETECTION BASED ON MULTIPLE SENSOR DEVICES

TECHNICAL FIELD

Aspects of the disclosure generally relate to detecting and determining accident fault using input from multiple sensor devices within vehicles, mobile devices, traffic devices, contextual data sources, and/or other data sources.

BACKGROUND

In some accidents involving one or more vehicles, it may be difficult to determine whether the driver of the vehicle is at fault or which driver is at fault in the case of accidents involving multiple vehicles. A first driver might attribute fault to the second driver, whereas the second driver might attribute fault to the first driver. Moreover, other factors, such as poor weather conditions, poor visibility, the presence of pedestrians, and the like, may factor into the fault calculation. What is needed is a way determining accident fault more accurately and efficiently by collecting accurate data, such as sensor or other data, from one or more data sensors or other devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to a system comprising one or more mobile computing device and/or an accident fault detection computing device. The mobile computing device may comprise a sensor configured to measure data indicative of an accident involving a vehicle, and a transmitter configured to transmit data measured by the sensor. The mobile computing device may also comprise a first processor, and first memory storing computer-executable instructions that, when executed by the first processor, cause the first processor of the mobile computing device to perform various steps. For example, the mobile computing device may measure, using the sensor of the mobile computing device, data indicative of an accident involving the vehicle, and send, using the transmitter of the mobile computing device, the measured data indicative of the accident to the accident fault detection computing device.

The accident fault detection computing device may comprise a receiver, a second processor, and second memory storing computer-executable instructions that, when executed by the second processor, cause the second processor of the accident fault detection computing device to perform various steps. For example, the accident fault detection computing device may receive, using the receiver of the accident fault detection computing device, the measured data indicative of the accident. In response to determining that an accident occurred, the accident fault detection computing device may receive, using the receiver of the accident fault detection computing device, data from a data source. The accident fault detection computing device may aggregate the measured data and the data from the data source to generate aggregated data, and may determine accident fault based on the aggregated data.

In some aspects, the sensor of the mobile computing device may comprise an accelerometer, and the measured data indicative of the accident may comprise acceleration data. Additionally or alternatively, the sensor may comprise a gyroscope, and the measured data indicative of the accident may comprise rotation data.

In some aspects, the second memory may store additional computer-executable instructions that, when executed by the second processor, causes the second processor of the accident fault detection computing device to determine a location of the accident using one or more of GPS data, Wi-Fi data, or cellular data associated with the mobile computing device. In response to determining that the accident occurred and prior to receiving the data from the data source, the accident fault detection computing device may transmit a request to the data source, and the request may comprise one or more of the location of the accident or a time of the accident.

In some aspects, the data from the data source may comprise one or more of traffic light status data, weather data, traffic condition data, or construction data for a location of the accident. Additionally or alternatively, the data from the data source may comprise one or more of sensor data from a vehicle sensor of the vehicle involved in the accident, sensor data from a second vehicle involved in the accident, or sensor data from a second mobile computing device located within the second vehicle during the accident. Additionally or alternatively, the data from the data source may comprise one or more of image data captured by a camera located within a threshold distance from the accident or sound data captured by a microphone located within a threshold distance from the accident.

In some aspects, the second memory may store additional computer-executable instructions that, when executed by the second processor, causes the second processor of the accident fault detection computing device to send a request for permission to access the data from the data source in response to determining that the accident occurred and prior to receiving the data from the data source. The accident fault detection computing device may receive, using the receiver of the accident fault detection computing device, a message indicating that the request for permission to access the data from the data source has been granted. Receiving the data from the data source may occur after receiving the message indicating that the request for permission to access the data from the data source has been granted.

In some aspects, the second memory may store additional computer-executable instructions that, when executed by the second processor, causes the second processor of the accident fault detection computing device to generate a visualization of the accident based on the aggregated data.

Other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Aspects may take the form of a computing device configured to perform specified actions. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
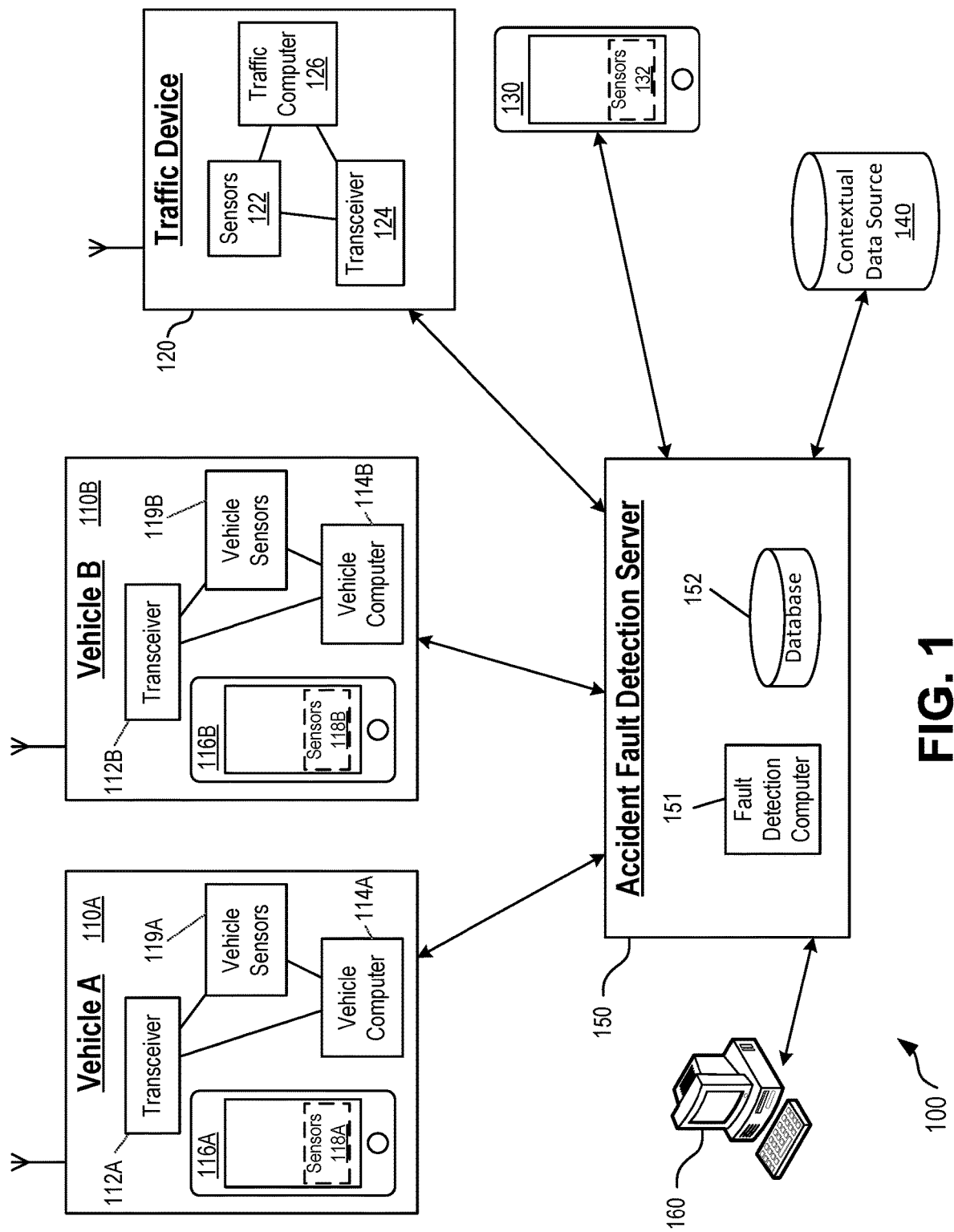
FIG. 1 is a diagram illustrating various example components of an accident fault detection system according to one or more aspects of the disclosure.

FIG. 1 is a diagram illustrating various example components of an accident fault detection system 100 according to one or more aspects of the disclosure. The accident fault detection system 100 may include a vehicle 110A, a vehicle 110B, and other vehicles (not illustrated), one or more traffic devices 120, one or more mobile devices 130 (e.g., a mobile device of a pedestrian), one or more contextual data source 140, a fault detection server 150, and additional related components. Each component of the accident fault detection system 100 may include a computing device (or system) having some or all of the following structural components.

For example, the accident fault detection computer or computing device 151 may have a processor for controlling overall operation of the computing device 151 and its associated components, including RAM, ROM, input/output module, and memory. The computing device 151, along with one or more additional devices (e.g., vehicle 110A, vehicle 110B, traffic device 120, mobile device 130, contextual data source 140), may correspond to any of multiple systems or devices, such as accident fault detection computing devices or systems, configured as described herein for transmitting and receiving sensor data, detecting an accident, and determining fault for that accident. Sensor data can include data collected from mobile devices (e.g., a driver's mobile phone, a passenger's mobile phone, a pedestrian's mobile phone), vehicle sensors, on-board diagnostic (OBD) systems, and/or off the shelf devices. Sensor data may refer to information pertaining to one or more actions or events performed or observed by a vehicle, a pedestrian, or traffic devices and can include aspects of information identified or determined from data collected from a vehicle, a stationary device, or a mobile device. Sensor data can include, for example, location data, speed or velocity data, acceleration data, presence data, time data, direction data, mobile device orientation data, rotation/gyroscopic data, and the like.

The fault detection computer 151 may include an Input/Output (I/O) module having a microphone, keypad, touch screen, and/or stylus through which a user of the computing device 151 may provide input, and may also include one or more of a speaker for providing audio input/output and a video display device for providing textual, audiovisual and/or graphical output. Software may be stored within the memory of the fault detection computer and/or other storage to provide instructions to its processor for enabling device 151 to perform various functions. For example, the computing device's memory may store software used by the device 151, such as an operating system, application programs, and an associated internal or external database 152. The memory unit may include one or more of volatile and/or non-volatile computer memory to store computer-executable instructions, data, and/or other information. The processor of the computer 151 and its associated components may allow the fault detection computer 151 to execute a series of computer-readable instructions to transmit or receive sensor data, process sensor data, and determine accident fault from the sensor data. One or more application programs used by the fault detection computing device 151 may include computer executable instructions (e.g., sensor data analysis programs, accident fault detection algorithms, and the like) for transmitting and receiving sensor and accident data and performing other related functions as described herein.

The fault detection computing device 151 may operate in a networked environment supporting connections to one or more remote computers, such as various other terminals/devices (e.g., terminal 160, which may include a display). The fault detection computing device 151, and the related terminals/devices, may communicate with devices installed in vehicles, mobile devices that may travel within vehicles, or devices outside of vehicles that are configured to receive and process vehicle and other sensor data. Thus, the fault detection computing device 151 and its associated terminals/devices may each include personal computers (e.g., laptop, desktop, or tablet computers) and/or servers (e.g., web servers, database servers) and may communicate with vehicle-based devices (e.g., on-board vehicle computers, short-range vehicle communication systems, sensor and telematics devices), or mobile communication devices (e.g., mobile phones, portable computing devices, and the like).

The devices illustrated in system 100 may communicate via network connections depicted such as a local area network (LAN) and a wide area network (WAN), and a wireless telecommunications network, but may also include other networks. When used in a LAN networking environment, the fault detection computing device 151 may be connected to the LAN through a network interface or adapter. When used in a WAN networking environment, the device 151 may include a modem or other means for establishing communications over the WAN, such as a network (e.g., the Internet). When used in a wireless telecommunications network, the device 151 may include one or more transceivers, digital signal processors, and additional circuitry and software for communicating with wireless computing devices (e.g., mobile phones, short-range vehicle communication systems, vehicle sensing and telematics devices) via one or more network devices (e.g., base transceiver stations) in the wireless network. It will be appreciated that the network connections shown and described above are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and fault detection system components described herein may be configured to communicate using any of these network protocols or technologies.

The vehicle 110A (or vehicle 110B) may be, for example, an automobile, motorcycle, scooter, bus, recreational vehicle, boat, or other vehicle for which sensor or accident data may be collected and analyzed. A mobile computing device 116A (or 116B) within the vehicle 110A (or 110B) may be used to collect sensor or accident data (e.g., via sensors 118A (or 118B)) and/or to receive sensor or accident data from the vehicle 110A (or 110B) (e.g., via vehicle sensors 119A (or 119B)). The mobile device 116A (or 116B) may process the data to detect an accident involving the vehicle 110A (or 110B) and/or transmit the sensor or accident data to the accident fault detection server 150 or other external computing devices. Mobile computing device 116A (or 116B) may be, for example, mobile phones, personal digital assistants (PDAs), tablet computers, laptop computers, smartwatches, and other devices that may be carried by drivers or passengers inside or outside of the vehicle 110A (or 110B).

The mobile computing device 116A (or 116B) may contain some or all of the hardware/software components of the computing device 151 described above. Software applications may be installed on and execute on the mobile device 116A (or 116B). The software applications may be configured to receive sensor data from internal sensors 118A (or 118B), such as acceleration, velocity, location, and the like and/or communicate with vehicle sensors 119A (or 119B) or other vehicle communication systems to sense or receive sensor data. For example, mobile device 116A (or 116B) equipped with Global Positioning System (GPS) functionality may determine vehicle location, speed, direction and other basic driving data without needing to communicate with vehicle sensors or external vehicle systems. The mobile software application may also receive sensor data from a wearable device, such as a smartwatch or a fitness band. In other examples, the software application on the mobile device 116A (or 116B) may be configured to receive some or all of the sensed data collected by sensors 119A (or 119B) of the vehicle 110A (or 110B).

When mobile computing device 116A (or 116B) within the vehicle 110A (or 110B) is used to sense vehicle data, the mobile computing device 116A (or 116B) may store, analyze, and/or transmit the vehicle data to one or more other computing devices. For example, mobile device 116A (or 116B) may transmit vehicle data directly to accident fault detection server 150, and thus may be used instead of sensors or communication systems of the vehicle 110A (or 110B).

The mobile device 116A (or 116B) may include various sensors 118A (or 118B) capable of detecting and recording conditions at and operational parameters of the vehicle 110A (or 110B) if the mobile device 116A (or 116B) is inside the vehicle. The sensors 118A (or 118B) may be used to sense, for example, the location of the mobile device 116A (or 116B), such as the GPS coordinates (e.g., latitude and longitude). The location of the mobile device 116A (or 116B) may also be determined based on wireless networks the mobile device has connected to, such as Wi-Fi networks, cellular networks, and the like.

The sensors 118A (or 118B) of the mobile device 116A (or 116B), such as a GPS and/or a compass, may sense the speed and/or direction at which the mobile device 116A (or 116B) and accordingly vehicle 110A (or 110B) is traveling. An accelerometer of the mobile device 116A (or 116B) may sense the acceleration of the mobile device. A gyroscope may be used to determine the orientation of the mobile device. The gyroscope may also be used to measure the speed of rotation of the mobile device 116A (or 116B). A magnetometer may be used to measure the strength and direction of the magnetic field relative to the mobile device. The sensors 118A (or 118B) previously described are exemplary, and the mobile device 116A (or 116B) may include any other sensors used for accident fault detection.

The data collected by the mobile device 116A (or 116B) may be stored and/or analyzed within the mobile device 116A (or 116B). The processing components of the mobile computing device 116A (or 116B) may be used to analyze sensor data, determine that an accident has or has not occurred, and determine fault for the accident. Additionally or alternatively, the mobile device 116A (or 116B) may transmit, via a wired or wireless transmission network, the data to one or more external devices for storage or analysis, such as vehicle computer 114A (or 114B) or accident fault detection server 150. In other words, mobile computing device 116A (or 116B) may be used in conjunction with, or in place of, the vehicle computer 114A (or 114B) or fault detection server 150 to detect accident fault.

The vehicle computer 114A (or 114B) of the vehicle 110A (or 110B) may contain some or all of the hardware/software components of the computing device 151 described above. The vehicle computer 114A (or 114B) may receive sensor or accident data from the mobile device 116A (or 116B) and/or from sensors 119A (or 119B) built into the vehicle 110A (or 110B). For example, vehicle computer 114A (or 114B) may receive accelerometer data from the mobile device 116A (or 116B) or an accelerometer in the vehicle 110A (or 110B) and use the accelerometer data to determine whether or not an accident has occurred. Sensors 119A (or 119B) may include, for example, telematics devices integrated with the vehicle and/or aftermarket telematics devices. The telematics devices may be used to track location, vehicle diagnostics, speed, acceleration, and the like. In some aspects, the aftermarket telematics devices may be connected to the vehicle by wire, such as via the vehicle's OBD port. Aftermarket devices may additionally or alternatively connect to the vehicle (or other devices within the vehicle, such as a mobile device) wirelessly.

The vehicle computer 114A (or 114B) may act as a gateway device between the mobile device 116A (or 116B) and the fault detection server 150. For example, the vehicle computer 114A (or 114B) may receive sensor data (or data indicating that an accident has occurred) from the mobile device 116A (or 116B) and forward the received data to the accident detection server 150. The vehicle 110A (or 110B) may include a short-range communication system 112A (or 112B), which will be described in further detail below. While two vehicles are illustrated in FIG. 1, any number of vehicles (and their computing devices, sensors, and mobile devices) may be used to detect an accident and to determine accident fault. Moreover, sensor data may be collected from one or more moving vehicles, one or more parked vehicles, or a combination of moving and parked vehicles.

The transceiver 112A (or 112B) may comprise or be part of a short-range communication system, such as a vehicle-based data transmission system configured to transmit vehicle data to other nearby vehicles, and to receive vehicle data from other nearby vehicles. In some examples, the transceiver 112A (or 112B) may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, the communication system 112A (or 112B) need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces.

The vehicle-to-vehicle (V2V) transmissions between the communication system 112A (or 112B) and another vehicle's communication system may be sent via DSRC, Bluetooth, satellite, GSM infrared, IEEE 802.11, WiMAX, RFID, and/or any suitable wireless communication media, standards, and protocols. In certain systems, the communication system 112A (or 112B) may include specialized hardware installed in vehicle 110A (or 110B) (e.g., transceivers, antennas, etc.), while in other examples the communication system 112A (or 112B) may be implemented using existing vehicle hardware components (e.g., radio and satellite equipment, navigation computers) or may be implemented by software running on the mobile device 116A (or 116B) of drivers and passengers within the vehicle 110A (or 110B).

The range of V2V communications between vehicle communication systems may depend on the wireless communication standards and protocols used, the transmission/reception hardware (e.g., transceivers, power sources, antennas), and other factors. Short-range V2V communications may range from just a few feet to many miles. V2V communications also may include vehicle-to-infrastructure (V2I) communications, such as transmissions from vehicles to non-vehicle receiving devices, for example, toll booths, rail road crossings, and road-side traffic monitoring devices. Certain V2V communication systems may periodically broadcast data from a vehicle 110A (or 110B) to any other vehicle, or other infrastructure device capable of receiving the communication, within the range of the vehicle's transmission capabilities. For example, a vehicle 110A (or 110B) may periodically broadcast (e.g., every 0.1 second, every 0.5 seconds, every second, every 5 seconds, etc.) certain vehicle data via its short-range communication system 112A (or 112B), regardless of whether or not any other vehicles or reception devices are in range. In other examples, a vehicle communication system 112A (or 112B) may first detect nearby vehicles and receiving devices, and may initialize communication with each by performing a handshaking transaction before beginning to transmit its vehicle data to the other vehicles and/or devices.

The types of vehicle data transmitted by the vehicle 110A (or 110B) may depend on the protocols and standards used for the V2V communication, the range of communications, whether an accident has been detected, and other factors. In certain examples, the vehicle 110A (or 110B) may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V communication system (e.g., vehicles and other reception devices) may use internal clocks with synchronized time signals, and may send transmission times within V2V communications, so that the receiver may calculate its distance from the transmitting node based on the difference between the transmission time and the reception time. The state or usage of the vehicle's 110A (or 110B) controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, windshield wipers, etc.). Vehicle warnings such as detection by the vehicle's 110A (or 110B) internal systems that the vehicle is skidding, that an impact has occurred, or that the vehicle's airbags have been deployed, also may be transmitted in V2V communications.

The mobile computing device 116A (or 116B) may be used instead of, or in conjunction with, the communication system 112A (or 112B). For example, the mobile device 116A (or 116B) may communicate directly with the other vehicle or directly with another mobile device, which may be inside or outside of the other vehicle. Additionally or alternatively, the other vehicle may communicate location information to vehicle 110A (or 110B), and vehicle 110A (or 110B) may in turn communicate this location information to the mobile device 116A (or 116B). Any data collected by any vehicle sensor or mobile device 116A (or 116B) sensor may be transmitted via V2V or other communication to other nearby vehicles, mobile devices, or infrastructure devices receiving V2V communications from communication system 112A (or 112B) or communications directly from mobile device 116A (or 116B). Further, additional vehicle driving data not from the vehicle's sensors (e.g., vehicle make/model/year information, driver information, etc.) may be collected from other data sources, such as a driver's or passenger's mobile device 116A (or 116B), accident fault detection server 150, and/or another external computer system, and transmitted using V2V communications to nearby vehicles and other transmitting and receiving devices using communication system 112A (or 112B).

The system 100 may also include a traffic device 120, containing some or all of the hardware/software components of the computing device 151 described above. The traffic device 120 may comprise one or more sensors 122, such as image sensors (e.g., cameras) or location sensors (e.g., GPS or other location sensors). For example, the traffic device 120 may comprise a traffic light, which may determine and store time and status data, such as whether the traffic light was red, yellow, or green at each point in time. The traffic device 120 may also comprise, for example, a traffic camera on the road (e.g., a standalone camera, a camera integrated in a traffic light, and the like) or a traffic camera in the air (e.g., a camera on a drone, a helicopter, an airplane, or any other aerial vehicle, whether manned or unmanned). The traffic device 120 may also comprise a transceiver 124 for transmitting and receiving data, and a traffic computer 126 used to process data and to determine data to send to the accident fault detection server 150.

The system 100 may include one or more mobile computing device 130, which may be similar to mobile computing devices 116A (or 116B), except that the mobile computing device 130 may be outside of a vehicle (e.g., a pedestrian's mobile device). The mobile computing device 130 may contain some or all of the hardware/software components of the computing device 151 described above. Software applications executing on the mobile device 130 may be configured to receive sensor data from sensors 132, such as acceleration, velocity, location, and the like. The location of the mobile device 130 may be determined based on wireless networks the mobile device has connected to, such as Wi-Fi networks, cellular networks, GPS, and the like. As described above, the sensors 132 may also comprise a compass, an accelerometer, a gyroscope, a magnetometer, or any other type of sensor. The mobile computing device 130 may also comprise other mobile devices or accessories, such as a wearable (e.g., a smartwatch).

The system 100 may comprise one or more contextual data sources 140. Each contextual data source 140 may comprise one or more database storing contextual data, such as weather data, traffic data, road pattern data, road construction data, time data, location data, etc. Contextual data may identify the on-scene dispatch vehicles, such as emergency vehicles or tow truck vehicles that responded to the accident. Other sources of contextual data will be described in further detail below. Data from the contextual data sources 140 may be accessed via, for example, open application program interfaces (APIs), databases, software development kits (SDKs), V2V communication, and/or mobile device to mobile device communication.

Systems and methods described herein may detect vehicular accidents based on sensor data, such as data from a mobile device in a vehicle or data from the vehicle's sensors. If an accident is detected, the system 100 may determine whether to collect sensor data from additional sources, such as additional vehicle sensors or additional mobile devices (e.g., a pedestrian's mobile device or a mobile device within a vehicle). The system 100 may also determine whether to collect data from traffic devices or from contextual data sources. The data may be used by the system 100 to determine which party is at fault in the accident. The data may also be used to generate a visualization of the accident. The previous description is merely exemplary, and additional examples of the accident fault detection system 100 and method performed by the system are described below.

Figure 2:
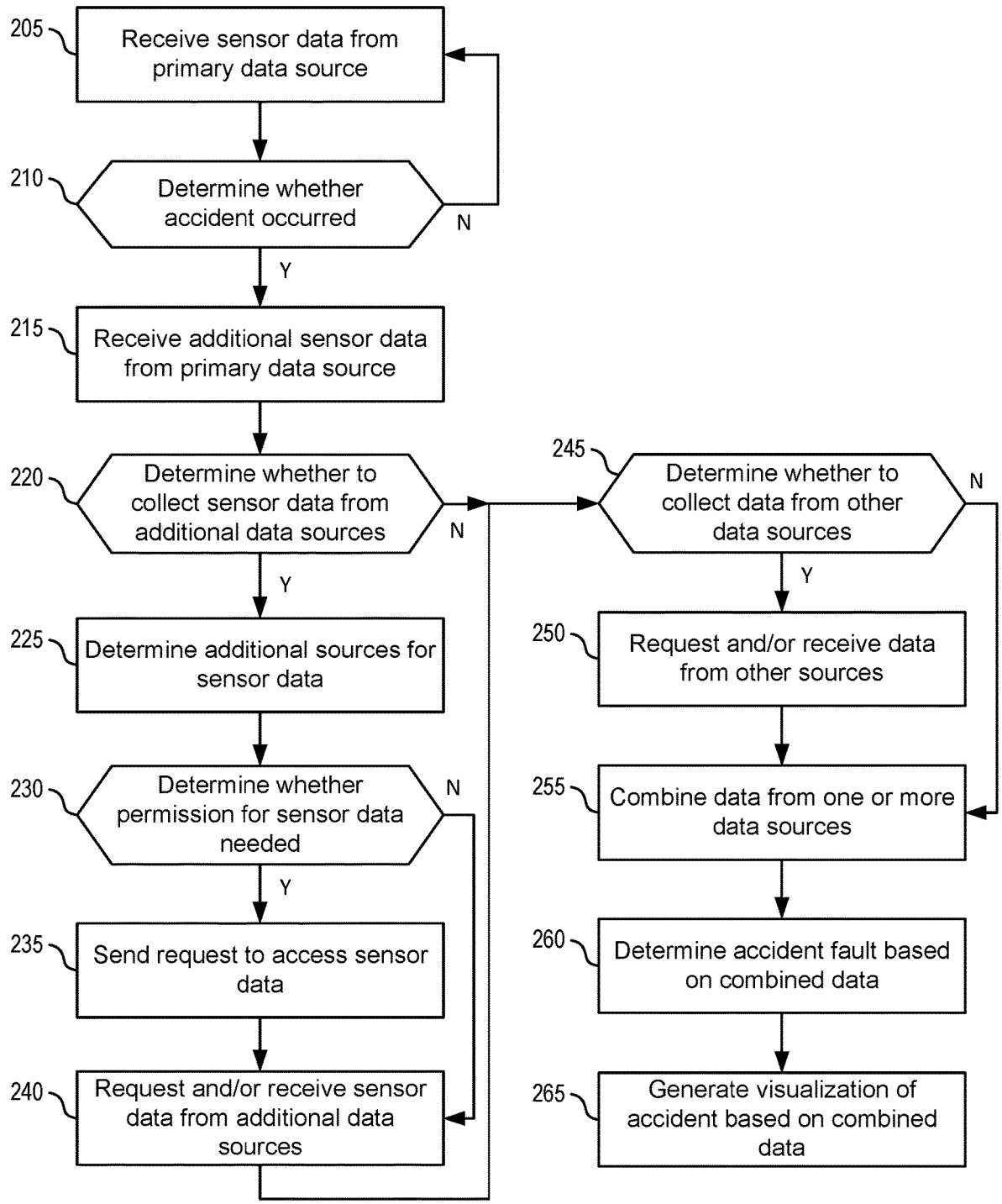
FIG. 2 is a flow diagram illustrating an example method of detecting and determining accident fault based on input from multiple sensor devices according to one or more aspects of the disclosure.

FIG. 2 is a flow diagram illustrating an example method of detecting and determining accident fault based on input from multiple sensor devices according to one or more aspects of the disclosure. The steps illustrated in FIG. 2 may be performed by one or more of the devices illustrated in FIG. 1.

In step 205, a computing device may receive (e.g., via wireless or wired transmission) sensor data from a primary data source, such as sensor data from a vehicle's sensors (e.g., vehicle sensors 119A or 119B) or sensor data from a mobile device (e.g., sensors 118A or 118B). In step 210, the computing device may determine whether an accident occurred based on the received sensor data. That is, the sensor data from the primary data source may be used to determine (e.g., detect) whether an accident involving the vehicle has occurred. Exemplary sensor data includes (but is not limited to) acceleration data, direction data, mobile device orientation data, rotation data, and/or any other data that may be used by the computing device to determine whether an accident occurred. For example, the computing device may determine an accident has occurred if the acceleration of vehicle 110A is above a threshold acceleration, if the change in direction or orientation of the vehicle 110A is above a threshold, etc. An accident may be detected based on a combination of sensor readings, such as accelerometer readings, gyroscope readings, and/or GPS readings.

The sensor data may comprise images (including still or moving images) captured by traffic devices 120 and/or a pedestrian's mobile device 130. The computing device may process the images to determine that an accident involving a vehicle has occurred. For example, traffic cameras or other cameras may be used to supplement and assess events surrounding the accident and the severity of an accident detected by other sensor data.

The computing device receiving the sensor data and/or determining whether an accident has occurred may be, for example, the mobile device 116A (or 116B) or the vehicle computer 114A (or 114B). Additionally or alternatively, the computing device receiving the sensor data may comprise the mobile device 130 (if it has software configured to detect accidents and/or accident fault) or fault detection computer 151. In some aspects, the primary data sources used to detect accidents may comprise particular devices identified by an insurance company, such as the devices that have applications managed, operated, owned, and/or developed by the insurance company. For example, the mobile devices 116A, 116B, or 130 may have the insurance company's mobile application installed and may be used to detect accidents. In some aspects, the computing device may determine that an accident has occurred if a customer or other user calls in to report the accident.

If the computing device determines that an accident has not occurred based on the received sensor data (step 210: N), the computing device may return to step 205 and continue to receive sensor data from one or more data sources to detect accidents. On the other hand, if the computing device determines that an accident has occurred based on the received sensor data (step 210: Y), the computing device may proceed to step 215.

In step 215, the computing device, such as the accident fault detection computer 151, may receive additional sensor data from the primary source. For example, if the computing device detected an accident based on one or more types of sensor data, such as acceleration data from an accelerometer of the mobile device 116A located within the vehicle 110A, the computing device may request and/or receive additional sensor data from sensors of the mobile device 116A, such as direction data, orientation data, rotation data, etc. The computing device may also receive sensor data from other devices associated with the vehicle 110A, such as data measured by the vehicle sensors 119A. Similarly, if the computing device detected the accident based on one or more types of sensor data measured by the vehicle sensors 119A, the computing device may request and/or receive additional sensor data from the vehicle sensors 119A and/or sensor data from the mobile device's sensors 118A. The computing device may automatically collect the sensor data.

In step 220, the computing device may determine whether to collect sensor data from additional (e.g., secondary) sources. If so (step 220: Y), the computing device may proceed to step 225. In step 225, the computing device may determine the additional sources for the sensor data. For example, the computing device may determine additional sources of sensor data based on distance from (e.g., proximity to) the primary data source (e.g., vehicle 110A and its associated mobile devices and/or sensors). As previously described, the location of the primary source may be determined based on GPS data, cellular signals, Wi-Fi signals, and the like. The location of the secondary data sources may similarly be determined using GPS, cellular signals, and/or Wi-Fi signals.

If the location of a secondary data source is within a threshold distance from the primary data source, the computing device may determine to collect sensor data from that secondary data source. For example, if the vehicle 110B is within a threshold distance from vehicle 110A, the computing device may determine to collect sensor data from vehicle B's sensors 119B and/or from mobile devices 116B within vehicle 110B. Similarly, if a pedestrian's mobile device 130 is within a threshold distance from vehicle 110A, the computing device may determine to collect data from the mobile device 130's sensors 132. The data collected from the mobile device 130 may comprise images captured by the mobile device's camera(s), sound captured by the mobile device's microphone(s), or telematics data from the mobile device's other sensors (e.g., acceleration data, velocity data, direction data, rotation data, and the like). The computing device may also determine to collect sensor data from a traffic device 120 (e.g., a traffic camera, a drone camera, etc.) that is within a threshold distance from the vehicle 110A or may determine to collect data from the closest traffic device 120.

The computing device may determine additional sources of sensor data based on whether the additional data source was involved in the accident. Whether the additional source of data (e.g., devices within another vehicle or a pedestrian's mobile device) was involved in the accident may be determined using location data, as explained above. Whether a secondary data source was involved in the accident may also be determined based on some sensor data from the secondary data source. For example, data from one or more sensors 118B in the mobile device 116B or from one or more of vehicle B's sensors 119B may indicate that vehicle 110B was involved in the same accident as vehicle 110A. This determination may be similar to the determination made in step 210 described above (e.g., if the acceleration measured by an accelerometer exceeds a threshold, if there is a rapid change in direction or orientation of the vehicle 110B, and the like). If the computing device determines that vehicle 110B was involved in the accident based on the sensor data, the computing device may determine to request and/or receive other sensor data from sensor devices associated with vehicle 110B.

The computing device may similarly determine whether a pedestrian was involved in the accident based on data from the pedestrian's mobile device 130. For example, accelerometer data from an accelerometer 132 at the mobile device 130 may indicate that the pedestrian's change in speed, direction, or orientation at the time of vehicle A's accident exceeds a threshold. As an example, a moving vehicle (e.g., vehicle 110A) may have needed to swerve to avoid a pedestrian (e.g., holding a mobile device 130) who dashed into the street, causing the moving vehicle 110A to crash into a parked vehicle 110B. In this example, the computing device may collect sensor data from at least moving vehicle 110A, parked vehicle 110B, and a pedestrian's mobile device 130. Sensor data may be collected for any vehicle or pedestrian involved in the accident. Moreover (and as explained above), sensor data may be collected from mobile devices within a vehicle (which might be moving or not moving and may include driver or passenger sensor data) or outside the vehicle (e.g., a pedestrian), original equipment manufacturer (OEM) sensor devices inside vehicles, and aftermarket sensor devices inside vehicles (e.g., on-board diagnostics devices and/or tags).

The computing device may also determine whether to collect sensor data from additional sources based on the anticipated criticality or severity of the accident and/or the number of vehicles or pedestrians involved. As previously described, the computing device may collect sensor data from all vehicles and pedestrians involved in the accident. However, the computing device may collect data from fewer sources based on the criticality and/or the number of vehicles or pedestrians involved. For example, if the anticipated criticality or severity of the accident falls below a threshold, the computing device may determine to collect sensor data from fewer than all of the vehicles and pedestrians involved. If the anticipated criticality or severity of the accident exceeds a threshold, the computing device may determine to collect sensor data from more vehicles or pedestrians (e.g., more than if the criticality does not exceed the threshold, such as all of the vehicles and pedestrians). Criticality may be measured by a combination of sensor readings and signatures. Criticality may additionally or alternatively be based on the assessed damage (e.g., in dollars or other currency).

In step 230, the computing device may determine whether permission for sensor data is needed. This may be determined based on a pre-approval from an owner or user of a device or vehicle (e.g., the user of a mobile device or driver or owner of a vehicle). The determination may also be based on a pre-approval by, for example, owners or operators of road-side cameras (e.g., traffic cameras, such as speed cameras or red light cameras) or aerial cameras (e.g., drones, airplanes, helicopters, etc.).

Whether permission is needed may be based on whether the user of a mobile device is a customer of the insurance company or is otherwise registered with the insurance company requesting the sensor data. Customers of the insurance company may register one or more of their devices with the insurance company, such as by providing an identifier for a mobile device (e.g., a MAC address, the name of the device, a SIM card number, a telephone number, or any other identifier for the device). Customers may similarly register a vehicle with the insurance company and provide a Vehicle Identification Number (VIN), a license plate number, or any other identifier for the vehicle. The computing device may look up a customer database to determine whether a user of a mobile device or operator of a vehicle is a customer. If the user is a customer, the computing device might not have to request permission for the customer's sensor data (step 230: N) because the customer might have previously indicated permission to access sensor data. If the user is not a customer, the computing device may determine in step 230 that permission for the sensor data is needed (step 230: Y). In some aspects, the primary data source used to identify an accident (e.g., in step 210 described above) may be a device or vehicle associated with a customer as opposed to a non-customer. The secondary data sources, on the other hand, might be devices or vehicles associated with either customers or non-customers.

Whether permission is needed may also be determined based on whether an application, such as a mobile application, has been installed on a sensor device, such as a mobile device (e.g., a smartphone, a tablet, a smartwatch, and the like). For example, a mobile application on a mobile device may continuously, intermittently, or periodically collect data from the mobile device's sensors. The accident fault detection server 150 might not need permission from a user of the mobile device having the mobile application installed because the mobile application collects the sensor data and sends the sensor data to the accident fault detection server 150. Alternatively, whether permission is needed may be based on whether the user has pre-granted permission, through the mobile application, for accessing sensor data.

In step 235, the computing device may send a request to access the sensor data if permission is needed (step 230: Y). For example, if a mobile device has the mobile application installed, a request to access the sensor data may be sent to the user via the mobile application. Alternatively, the computing device may send a request message to the user using other transmission methods, such as email, text message, and the like. The user may respond to the request message using his or her mobile device or via another device that can access the request message, such as a laptop, a desktop, or any other computing device that can display the request message. The request message may indicate that the user will receive an incentive, such as payment, if the user agrees to grant the computing device permission to access the device's sensor data.

In some aspects, if the user of the mobile device or of the vehicle is not a customer of the insurance company, the computing device may determine whether the user is a customer of another insurance company. The computing device may send the request in step 235 to the other insurance company once the other insurance company has been identified. Accessing sensor data (as described above) may become an industry standard and the data may be shared among all major insurance companies participating in the program. Each person with a sensor collection application (e.g., mobile application) may be uniquely identified in a database, which can then be used to collect relevant data from the database. Sensor data collected by each insurance company may be sent to and stored at a centralized database or server, and each participant in the program may have access to the data via the centralized database or server. Additionally or alternatively, cellular service providers may also create a centralized database or server for storage of sensor data from mobile phones or tablets and their associated accessories. The computing device may also access the sensor data via the cellular service providers' servers or databases. Any of the data described herein may be accessed with the appropriate permissions (e.g., users can authorize the system to access the data). This authorization may be in addition to the permissions described above.

The computing device may also send a request to participants and witnesses of an accident to provide additional data. Participants and witnesses may be identified from, for example, GPS data or other location data detected by their mobile devices. In some aspects, the participants and witnesses may be identified from the GPS or other location data or other data associated with the user's mobile device or from the user's profile in the above-mentioned database. The computing device may send a request to the user's mobile device or other device asking if the user saw the accident and/or to provide other information related to the accident. For example, participants and witnesses may be requested to indicate whether vehicles involved in the accident were moving or stationary, which direction vehicles were moving at the time of the accident or before the accident, whether a traffic light was red, yellow, or green, or any other questions that may be relevant to determining fault for the accident.

In step 240, the computing device may request and/or receive sensor data from the additional (e.g., secondary) sources. The computing device may request the data if permission for the data has been granted in step 235 or if the computing device determined that permission for the sensor data is not needed (e.g., step 230: N).

In step 245, the computing device may determine whether to collect data from other data sources, such as data (e.g., non-sensor data) from one or more traffic device 120 (e.g., a traffic light or other on-road traffic device) or data from one or more contextual data source 140 (e.g., weather data, traffic data, etc.). As previously explained, the computing device may determine to collect data from a traffic device 120 within a threshold distance from the location of the accident, which may be determined based on the location of the vehicle 110A or mobile device 116A located within the vehicle 110A. In some aspects, the weather data, traffic data, or other contextual data may be collected by default for each accident detected, because it may comprise relevant data.

In step 250, the computing device may request and/or receive data from the other sources if data is to be collected from the other sources (step 245: Y). The computing device may determine the time and/or location of the accident and send the time and/or location to the data source so that the data source can identify the relevant data to send back to the computing device. For example, the computing device may send the time of the accident to a traffic light (or a storage device that stores traffic light data), and the traffic light may send back data indicating the status of the traffic light (red, yellow, green, red turn, etc.) at the time of the accident, a time period before the accident (e.g., thirty minutes before the accident), and a time period after the accident (e.g., thirty minutes after the accident).

The computing device may similarly send a request to and/or receive image data (e.g., photographs, video, etc.) from one or more image capture devices and/or their associated storage devices or computers. Exemplary image capture devices include traffic cameras, cameras mounted on buildings, drones and other aerial vehicles, OEM or aftermarket cameras mounted on vehicles, or mobile device cameras. In some aspects, drones having cameras may be deployed to densely populated areas, near intersections, or other locations prone to accidents. Drones may be deployed at certain times, such as during rush hour, and may take near 360 degree aerial pictures from a safe distance, offering a view not easily captured from the street.

The computing device may also send time and/or location information to contextual data sources and receive contextual data corresponding to the time and/or location information. Exemplary contextual data includes, but is not limited to, weather data, traffic data, road pattern data, signage data, data indicating locations of potholes, time of day data, day of week data, data indicating holidays, data indicating road construction locations, and the like. For example, the computing device may send time and location information to a weather data source and receive weather data corresponding to the time and location (e.g., weather data from 10 AM to 10:30 AM for San Antonio, Tex.). The computing device may similarly send time and location information to other data sources to receive the data, such as traffic data sources, road pattern data sources, and the like.

If the on-scene dispatch, such as emergency services or which tow truck service was used, is known, the computing device may send a request for data from the on-scene dispatch. Examples of information that may be requested from on-scene dispatches include the company handling the on-scene dispatch, where the dispatch is taking the vehicle, when the dispatch is taking the vehicle, how much the dispatch is charging, and the like. Other examples of data relevant to the accident that the service provider can offer include, but are not limited to, vehicle orientation, vehicle damage, road conditions, number of parties involved, etc. This information may be used for the claims process and to determine effectiveness of the dispatch. If an inspection of the vehicle is performed, the computing device may determine a method of inspection (e.g., a field inspection center, a field tech, etc.). If a settlement or insurance claim was made, the computing device may determine the method of settlement (e.g., a selection of the shop used to repair a vehicle), whether medical claims or treatments were made, the first notice of loss, etc.

In step 255, the accident fault detection server 150 may combine or otherwise aggregate data from one or more of the data sources (e.g., vehicle 110A, vehicle 110B, traffic device 120, pedestrian mobile device 130, contextual data source 140, or any other data sources). The computing device may overlay the data (e.g., apply data in a layered manner). The server 150 may take sensor data and external contextual data and combine it in a manner that would allow the system to recreate the accident to determine details of the accident. For example, one recreated accident may indicate that the accident occurred at night time, icy conditions existed, visibility was poor, traffic was light, the accident occurred at an intersection, and the accident was a broadside accident. The recreated accident may also indicate that car A was driving in excess of the speed limit, and car B was in the intersection waiting to turn. The recreation may indicate that car A may have had a hard braking event, followed by a skid, and followed by an impact with car B. Based on sensor data, the server 150 may determine accident location, accident time, the severity of the impact, and events immediately following the accident. Traffic camera data and external emergency services data may be used to supplement the data. Other examples of recreating an accident will be described in further detail below.

In step 260, the accident fault detection server 150 may determine accident fault based on the combined data. That is, the server 150 may determine to a particular degree of accuracy the entity at fault for the accident based on the overlaid data. In some aspects, the server 150 may generate a score or other metric for each party involved (e.g., drivers and pedestrians), and the score may indicate a percentage likelihood of fault. The score may be a percentage value (e.g., party A is 90% at fault and party B is 10% at fault for the accident) or another metric, such as a rating. In some aspects, the server 150 may use past data from accidents to determine fault. For past accidents, fault may be assigned to each party. The server 150 may determine whether combined data for the current accident matches any of the past accidents. If so, the server 150 may allocate fault based on fault allocated in the past accidents. The sensor data may allow the server 150 to assess behaviors of the parties involved in the accident before and during the actual event. The server 150 may recreate the accident (e.g., location, speed, angle, etc.) in combination with the contextual data. For contextual data, the server 150 may use a predictive model that attributes a score to aspects of the accident, such as weather, traffic, time of day, etc. This may allow the server 150 or users to assess what type of driving is predictive of risk based on conditions. The server 150 may use a predictive model for both driving behavior and contextual data that is used to attribute a fault score to each party involved.

In step 265, the accident fault detection server 150 may generate a visualization of the accident based on the combined data. The visualization may comprise a computer-generated reconstruction or other simulation of the accident through visualization of data (e.g., videos, animations, or other graphics). The visualization may comprise a user interface, such as a graphical user interface. The visualization may also be used to determine accident fault as described with reference to step 260 above. The visualization may be used in some circumstances, such as during subsequent litigation involving the accident.

A brief, non-limiting, example of the generated visualization will be described. Assume that during an actual accident, a vehicle (e.g., vehicle 110A) is stationary at a red light for a period of time, and another vehicle (e.g., vehicle 110B) comes along and rear ends the stationary car. The accident fault detection server 150 may have received sensor data from vehicle 110A (the stationary vehicle) or a mobile device 116A within vehicle 110A. The sensor data may indicate the acceleration of vehicle 110A and which direction the vehicle 110A accelerated as a result of being rear ended. The server 150 may have also received sensor data from vehicle 110B (the moving vehicle) or a mobile device 116B within the vehicle 110B. The sensor data may indicate the deceleration of vehicle 110B and lateral, longitudinal, or rotational movements of vehicle 110B as a result of it rear-ending vehicle 110A. The accident fault detection server 150 may generate a visualization of vehicle 110A being rear-ended by vehicle 110B, the visualization incorporating the acceleration, deceleration, and directional numbers received from sensors.

The fault detection server 150 may also receive data from a contextual weather data source during the time of the accident. The received weather data may indicate that it was raining heavily at the location (e.g., 2 inches of rain per hour) during the accident. The server 150 may add simulated raindrops to the visualization, the simulated raindrops dropping at 2 inches per hour. The server 150 may also receive data from the traffic light at which the vehicle 110A was stopped. For example, the traffic light may have been red at the time of the accident, and the server 150 may add a red traffic light to the visualization. The fault detection server 150 may complete the simulation once all of the relevant data sources have been accounted for. The server 150 may send the simulation for display on one or more displays, such as the workstation 160.

The accident fault detection server 150 may determine fault and generate visualizations for any type of accident. Several non-limiting examples will now be provided. A northbound vehicle may perform a U-turn shortly before being hit by a southbound vehicle. A northbound vehicle may swerve to avoid an obstacle in the road, missing the obstacle but hitting a southbound vehicle. Vehicle 2 may be waiting on vehicle 1 to back out of a parking space, and then intentionally speed up as vehicle 1 exits the spot such that vehicle 1 reverses into vehicle 2 (e.g., a fraud). Vehicle 1 may be traveling at an average of 20 miles over the speed limit and show a pattern of hard cornering and hard braking. Vehicle 1 may swerve off the road and hit a tree or other object. A vehicle in an outer southbound lane may sharply change lanes, and the driver might not see the vehicle in his or her blind spot. The second vehicle in the blind spot may break hard to avoid collision and may be rear ended by a third vehicle (e.g., a ripple accident). A westbound vehicle might not stop at a 4-way stop and may proceed to turn right seconds before colliding with an east bound vehicle that had stopped at its stop sign and begun a left turn.

Figure 3:
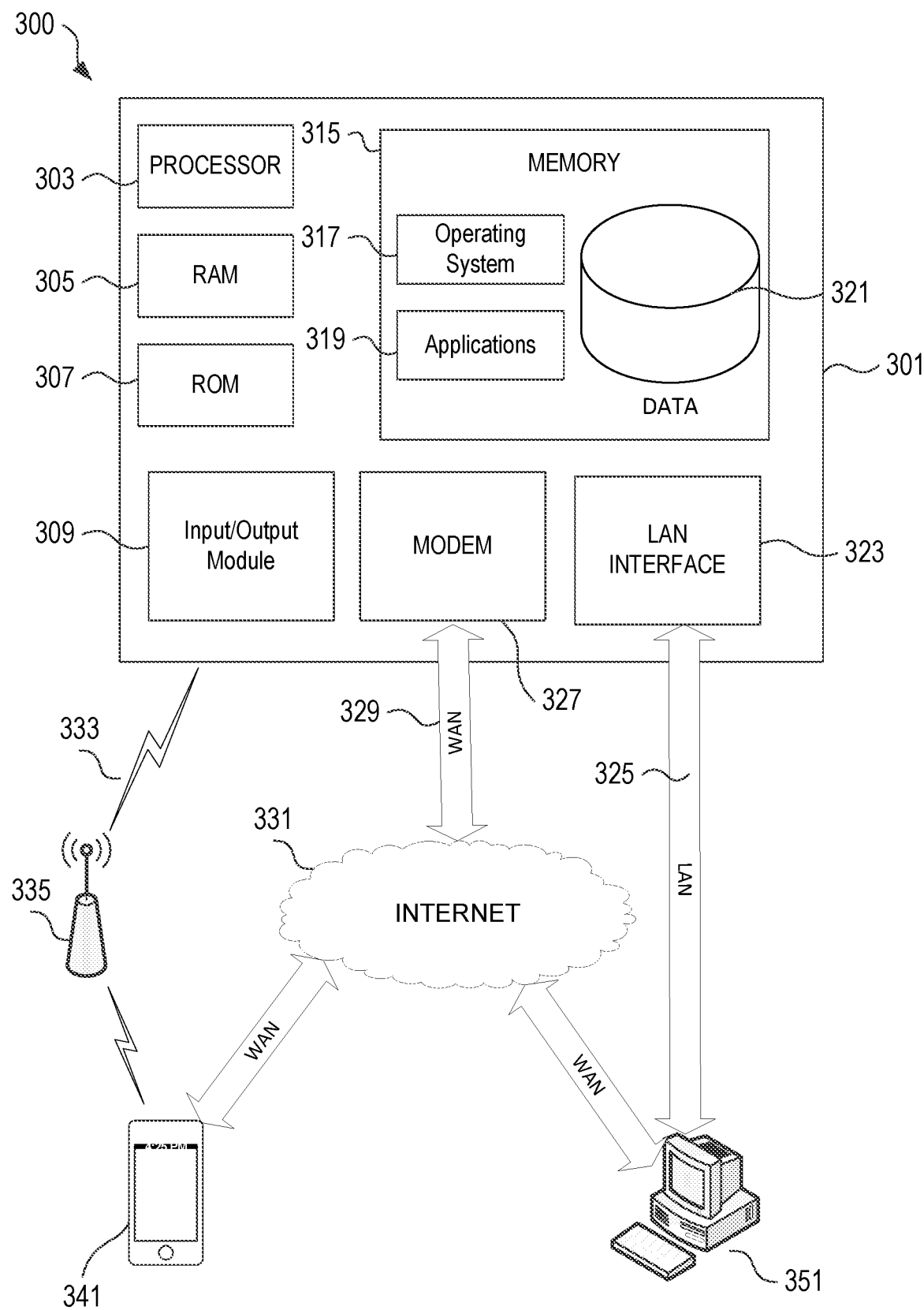
FIG. 3 illustrates a network environment and computing systems that may be used to implement aspects of the disclosure.

FIG. 3 illustrates a block diagram of a computing device 301 in accident fault detection system 300 that may be used according to one or more illustrative embodiments of the disclosure. The computing device 301 may have a processor 303 for controlling overall operation of the computing device 301 and its associated components, including RAM 305, ROM 307, input/output module 309, and memory unit 315. The computing device 301, along with one or more additional devices (e.g., terminals 341, 351) may correspond to any of multiple systems or devices, such as accident fault detection devices or systems, configured as described herein for receiving data from vehicles, traffic devices, mobile devices, and contextual data sources, and/or using the data to determine accident fault.

Input/Output (I/O) module 309 may include a microphone, keypad, touch screen, and/or stylus through which a user of the computing device 301 may provide input, and may also include one or more of a speaker for providing audio input/output and a video display device for providing textual, audiovisual and/or graphical output. Software may be stored within memory unit 315 and/or other storage to provide instructions to processor 303 for enabling device 301 to perform various functions. For example, memory unit 315 may store software used by the device 301, such as an operating system 317, application programs 319, and an associated internal database 321. The memory unit 315 includes one or more of volatile and/or non-volatile computer memory to store computer-executable instructions, data, and/or other information. Processor 303 and its associated components may allow the computing device 301 to execute a series of computer-readable instructions to receive data from vehicles, traffic devices, mobile devices, and/or contextual data sources, and using the data to determine accident fault.

The computing device 301 may operate in a networked environment 300 supporting connections to one or more remote computers, such as terminals/devices 341 and 351. The computing device 301, and related terminals/devices 341 and 351, may include devices installed in vehicles, mobile devices that travel within vehicles, or devices outside of vehicles that are configured to receive and process sensor and contextual data. Thus, the computing device 301 and terminals/devices 341 and 351 may each include personal computers (e.g., laptop, desktop, or tablet computers), servers (e.g., web servers, database servers), vehicle-based devices (e.g., on-board vehicle computers, short-range vehicle communication systems, sensors and telematics devices), or mobile communication devices (e.g., mobile phones, portable computing devices, and the like), and may include some or all of the elements described above with respect to the computing device 301. The network connections depicted in FIG. 3 include a local area network (LAN) 325 and a wide area network (WAN) 329, and a wireless telecommunications network 333, but may also include other networks. When used in a LAN networking environment, the computing device 301 may be connected to the LAN 325 through a network interface or adapter 323. When used in a WAN networking environment, the device 301 may include a modem 327 or other means for establishing communications over the WAN 329, such as network 331 (e.g., the Internet). When used in a wireless telecommunications network 333, the device 301 may include one or more transceivers, digital signal processors, and additional circuitry and software for communicating with wireless computing devices 341 (e.g., mobile phones, short-range vehicle communication systems, vehicle sensing and telematics devices) via one or more network devices 335 (e.g., base transceiver stations) in the wireless network 333.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, Wi-Fi, and WiMAX, is presumed, and the various computing devices and risk map generation system components described herein may be configured to communicate using any of these network protocols or technologies.

Additionally, one or more application programs 319 used by the computing device 301 may include computer executable instructions (e.g., fault detection algorithms, and the like) for receiving vehicle data, traffic device data, mobile device data and/or contextual data, determining accident fault, and performing other related functions as described herein.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:
1. A system comprising:
a mobile computing device disposed inside of a first vehicle, the mobile computing device comprising:
a first processor; and
first memory storing computer-executable instructions that, when executed by the first processor, cause the first processor of the mobile computing device to:
obtain first data indicating that a change in direction or orientation of the first vehicle exceeds a threshold direction or orientation and indicating that airbags of the first vehicle have been deployed, wherein the first data comprises data indicating acceleration or deceleration of the first vehicle and directional movements of the first vehicle wherein the obtaining the first data comprises:
measuring, using a sensor of the mobile computing device, the change in direction or orientation of the first vehicle, and
receiving, by the mobile computing device from an internal system of the first vehicle, an indication that the airbags of the first vehicle have been deployed; and
send, using a transmitter of the mobile computing device, the first data; and
an accident fault detection computing device comprising:
a second processor; and
second memory storing computer-executable instructions that, when executed by the second processor, cause the second processor of the accident fault detection computing device to:
automatically receive, using a receiver of the accident fault detection computing device, the first data;
determine, based on the first data indicating that the change in direction or orientation of the first vehicle exceeds the threshold direction or orientation and indicating that the airbags of the first vehicle have been deployed, that an accident involving the first vehicle occurred;
in response to determining that the accident occurred, receive, using the receiver of the accident fault detection computing device, second data from a data source different from the mobile computing device, wherein the second data comprises data indicating acceleration or deceleration of a second vehicle, involved in the accident, and directional movements of the second vehicle, weather data, and traffic light status data;
generate, based on the first data that comprises the data indicating the acceleration or deceleration of the first vehicle and the directional movements of the first vehicle, and based on the second data that comprises the data indicating the acceleration or deceleration of the second vehicle and the directional movements of the second vehicle, the weather data, and the traffic light status data, a computer-generated reconstruction of the accident comprising visualization, through one or more of videos or animations, of:

one or more of the acceleration or deceleration of the first vehicle and the directional movements of the first vehicle, or the acceleration or deceleration of the second vehicle and the directional movements of the second vehicle,
a weather during the accident, and
a traffic light status during the accident; and
determine, based on the first and second data and historical data indicating accident fault scores allocated in past accidents, an accident fault score, for the accident, for at least one of the first vehicle and the second vehicle, wherein the accident fault score comprises a percentage likelihood of fault associated with at least one of the first vehicle and the second vehicle.

2. The system of claim 1, wherein the second memory storing computer-executable instructions, that cause the second processor of the accident fault detection computing device to visualize the weather during the accident, when executed by the second processor, cause the second processor of the accident fault detection computing device to:
add, based on the weather data, simulated raindrops to the visualization.

3. The system of claim 1, wherein the second memory stores additional computer-executable instructions that, when executed by the second processor, causes the second processor of the accident fault detection computing device to:
determine a location of the accident using one or more of GPS data, Wi-Fi data, or cellular data associated with the mobile computing device; and
in response to determining that the accident occurred and prior to receiving the second data, transmit a request comprising one or more of the location of the accident or a time of the accident.

4. The system of claim 1, wherein the second data further comprises construction data for a location of the accident.

5. The system of claim 1, wherein the second data further comprises traffic condition data.

6. The system of claim 1, wherein the second data further comprises one or more of image data captured by a camera located within a threshold distance from the accident or sound data captured by a microphone located within a threshold distance from the accident.

7. The system of claim 1, wherein the second memory stores additional computer-executable instructions that, when executed by the second processor, causes the second processor of the accident fault detection computing device to:
in response to determining that the accident occurred and prior to receiving the second data, send a request for permission to access the second data; and
receive, using the receiver of the accident fault detection computing device, a message indicating that the request for permission to access the second data has been granted,
wherein receiving the second data occurs after receiving the message indicating that the request for permission to access the second data has been granted.

8. The system of claim 1, wherein the determining accident fault score is based on:
behaviors of the first and second vehicles before and during the accident that are indicated in the first data and the second data.

9. A non-transitory computer readable medium storing instructions that, when read by a computing device, cause the computing device to:
automatically receive, using a receiver of the computing device, and from a mobile computing device located inside of a first vehicle and from an internal system of the first vehicle, first data measured by a sensor of the mobile computing device and by the internal system of the first vehicle, wherein the first data indicates that a change in direction or orientation of the first vehicle exceeds a threshold direction or orientation and indicates that airbags of the first vehicle have been deployed, and wherein the first data comprises data indicating acceleration or deceleration of the first vehicle and directional movements of the first vehicle;
determine, based on the first data indicating that the change in direction or orientation of the first vehicle exceeds the threshold direction or orientation and indicating that the airbags of the first vehicle have been deployed, that an accident involving the first vehicle occurred;
in response to determining that the accident occurred, receive, using the receiver of the computing device, second data from a data source different from the mobile computing device, wherein the second data comprises data indicating acceleration or deceleration of a second vehicle, involved in the accident, and directional movements of the second vehicle, weather data, and traffic light status data;
generate, based on the first data that comprises the data indicating the acceleration or deceleration of the first vehicle and the directional movements of the first vehicle, and based on the second data that comprises the data indicating the acceleration or deceleration of the second vehicle and the directional movements of the second vehicle, the weather data, and the traffic light status data, a computer-generated reconstruction of the accident comprising visualization, through one or more of videos or animations, of:
one or more of the acceleration or deceleration of the first vehicle and the directional movements of the first vehicle, or the acceleration or deceleration of the second vehicle and the directional movements of the second vehicle,
a weather during the accident, and
a traffic light status during the accident; and
determine, based on the first and second data and historical data indicating accident fault scores allocated in past accidents, an accident fault score, for the accident, for at least one of the first vehicle and the second vehicle, wherein the accident fault score comprises a percentage likelihood of fault associated with at least one of the first vehicle and the second vehicle.

10. The non-transitory computer readable medium of claim 9, wherein the instructions, that cause the computing device to visualize the weather during the accident, when read by the computing device, cause the computing device to:
add, based on the weather data, simulated raindrops to the visualization.

11. The non-transitory computer readable medium of claim 9, storing additional instructions that, when read by the computing device, cause the computing device to:
determine a location of the accident using one or more of GPS data, Wi-Fi data, or cellular data associated with the mobile computing device; and
in response to determining that the accident occurred and prior to receiving the second data, transmit a request comprising one or more of the location of the accident or a time of the accident.

12. The non-transitory computer readable medium of claim 9, wherein the second data further comprises construction data for a location of the accident.

13. The non-transitory computer readable medium of claim 9, wherein the second data further comprises traffic condition data.

14. The non-transitory computer readable medium of claim 9, wherein the second data further comprises one or more of image data captured by a camera located within a threshold distance from the accident or sound data captured by a microphone located within a threshold distance from the accident.

15. The non-transitory computer readable medium of claim 9, storing additional instructions that, when read by the computing device, cause the computing device to:
- in response to determining that the accident occurred and prior to receiving the second data, send a request for permission to access the second data; and
- receive, using the receiver of the computing device, a message indicating that the request for permission to access the second data has been granted,
- wherein receiving the second data occurs after receiving the message indicating that the request for permission to access the second data has been granted.

16. The non-transitory computer readable medium of claim 9, wherein the computer-generated reconstruction of the accident comprises a graphical user interface.

17. A method comprising:
- automatically receiving, using a receiver of a server device and from a mobile computing device located inside of a first vehicle and from an internal system of the first vehicle, first data measured by a sensor of the mobile computing device and by the internal system of the first vehicle, wherein the first data indicates that a change in direction or orientation of the first vehicle exceeds a threshold direction or orientation and indicates that airbags of the first vehicle have been deployed, and wherein the first data comprises data indicating acceleration or deceleration of the first vehicle and directional movements of the first vehicle;
- determining, based on the first data indicating that the change in direction or orientation of the first vehicle exceeds a threshold direction or orientation and indicating that the airbags of the first vehicle have been deployed, that an accident involving the first vehicle occurred;
- in response to the determining that the accident occurred, receiving, using the receiver of the server device, second data from a data source different from the mobile computing device, wherein the second data comprises data indicating acceleration or deceleration of a second vehicle, involved in the accident, and directional movements of the second vehicle, weather data, and traffic light status data;
- generating, based on the first data that comprises the data indicating the acceleration or deceleration of the first vehicle and the directional movements of the first vehicle, and based on the second data that comprises the data indicating the acceleration or deceleration of the second vehicle and the directional movements of the second vehicle, the weather data, and the traffic light status data, a computer-generated reconstruction of the accident comprising visualization, through one or more of videos or animations, of:
  - one or more of the acceleration or deceleration of the first vehicle and the directional movements of the first vehicle, or the acceleration or deceleration of the second vehicle and the directional movements of the second vehicle,
  - a weather during the accident, and
  - a traffic light status during the accident; and
- determining, based on the first and second data and historical data indicating accident fault scores allocated in past accidents, an accident fault score, for the accident, for at least one of the first vehicle and the second vehicle, wherein the accident fault score comprises a percentage likelihood of fault associated with at least one of the first vehicle and the second vehicle.

18. The method of claim 17, further comprising:
- determining a location of the accident using one or more of GPS data, Wi-Fi data, or cellular data associated with the mobile computing device; and
- in response to determining that the accident occurred and prior to receiving the second data, transmitting a request comprising one or more of the location of the accident or a time of the accident.

19. The method of claim 17, wherein the second data further comprises one or more of weather data or traffic condition data, construction data for a location of the accident, image data captured by a camera located within a threshold distance from the accident, or sound data captured by a microphone located within a threshold distance from the accident.

20. The method of claim 17, wherein the determining accident fault score is based on:
- behaviors of the first and second vehicles before and during the accident that are indicated in the first data and the second data.

* * * * *